Patented Jan. 4, 1944

2,338,571

UNITED STATES PATENT OFFICE 2,338,571

PROCESS OF PURIFYING 3-PICOLINE

Francis E. Cislak and William R. Wheeler, Indianapolis, Ind., assignors to Reilly Tar & Chemical Corporation, Indianapolis, Ind., a corporation of Indiana No Drawing. Application March 25, 1942, Serial No. 436,170

16 Claims. (Cl. 260—290)

Our invention relates to the purification of 3-picoline from such contaminants as 4-picoline and 2,6-lutidine with which it is commonly associated as ordinarily prepared from coal tar.

We have found that by heating an impure 3-picoline, containing 4-picoline and/or 2,6-lutidine, and sometimes containing the contaminants even in predominating amount, with oxides, oxyhalides, or halides of phosphorus or sulfur, the contaminants are transformed by reaction with the oxide, oxyhalide, or halide into complex non-volatile materials, while the 3-picoline remains substantially unattacked beyond mere salt formation. By "halide" as used in the present specification and claims, we include chloride, bromide, and iodide, but exclude fluoride.

By this selective reaction with sulfur or phosphorus oxides, oxyhalides, or halides, we change the mixture from one in which the components are very difficult to separate one from another, due to their close resemblance in physical and chemical properties, into one in which the components are very easy to separate one from another by common and simple methods, such for instance as distillation. That is, a mixture of 3-picoline with either or both of 4-picoline and 2,6-lutidine is difficult to separate into its components, to get 3-picoline in substantially pure form, because all these components boil at very nearly the same temperature (about 143–144° C.); but after the selective reaction with the sulfur or phosphorus oxide, oxyhalide, or halide that converts the 4-picoline and the 2,6-lutidine into the complex and non-volatile reaction products, those reaction products have quite different properties, both chemical and physical, from the remaining unattacked 3-picoline, so that separation of the 3-picoline from those reaction products may readily be effected by physical or chemical means.

No precise temperature is necessary for the reaction; but a temperature above 100° C. is desirable.

We prefer to carry out the reaction at about the boiling point of 3-picoline at atmospheric pressure (about 143–144° C.); for we can obtain and maintain these conditions readily by the use of a reflux condenser. If a lower temperature is used the rate of reaction is slower, and if a higher temperature is used the rate of reaction is more rapid.

The following are examples of our process:

Example 1.—To 46.5 gms. of a refined picoline cut containing 82% of 3-picoline and 18% of 4-picoline is added 21.0 gms. of chlorosulfonic acid (an oxyhalide of sulfur). The solution is then refluxed about 24 hours at atmospheric pressure. The chlorosulfonic acid reacts with the 4-picoline, though very little if at all with the 3-picoline, to form a non-volatile reaction product. After the refluxing the mixture is diluted with water, made alkaline with sodium carbonate, and then steam-distilled. The distillate is saturated with caustic soda and cooled, whereupon 3-picoline of better than 98% purity separates.

Example 2.—A mixture of 46.5 gms. of a refined picoline cut containing 82% of 3-picoline and 18% of 4-picoline and 27.6 gms. of phosphorus oxytrichloride (an oxyhalide of phosphorus) is refluxed for 24 hours. The phosphorus oxytrichloride reacts with the 4-picoline, but very little if at all with the 3-picoline. The reaction mixture is made alkaline, as with sodium-carbonate solution, and steam-distilled. The unreacted 3-picoline is separated from the distillate by addition of caustic soda, and is found to be of exceptionally high purity—over 98%.

If preferred, the unchanged 3-picoline may be distilled directly from the reaction mixture.

Example 3.—A mixture of 48 gms. of a refined picoline cut containing 45% of 3-picoline, 33% of 4-picoline, and 22% of 2,6-lutidine is refluxed with 103 gms. of sulfur monochloride (a halide of sulfur) for about 3 hours. The sulfur monochloride reacts with both the 4-picoline and the 2,6-lutidine, to produce a black pitch-like complex reaction product; but reacts very little if at all with the 3-picoline. The reaction mixture is made alkaline, as with sodium-hydroxide or sodium-carbonate solution, and steam-distilled. The distillate is a mixture of water and 3-picoline of about 80% purity. The 3-picoline may be recovered from the aqueous solution in known manner.

Example 4.—In place of the chlorosulfonic acid of Example 1, the phosphorus oxytrichloride of Example 2, or the sulfur monochloride of Example 3, we can use molecular-equivalent quantities of other oxyhalides or halides of sulfur or phosphorus, or oxides of sulfur or phosphorus including (by way of example) the following:

Phosphorus pentachloride
Phosphorus trichloride
Phosphorus tribromide
Phosphorus triiodide
Phosphorus pentoxide
Sulfur trioxide
Sulfuryl chloride
Thionyl chloride

*Example 5.*—About 48 gms. of a refined picoline cut containing about 45% of 3-picoline, 33% of 4-picoline, and 22% of 2,6-lutidine is heated to reflux, and a slow stream of sulfur dioxide is passed through it for about 24-36 hours. The reaction mixture becomes dark and viscous, by the reaction of the sulfur dioxide on the 4-picoline and the 2,6-lutidine; but the 3-picoline is acted on very little if at all. This 3-picoline is recovered from the reaction product as in Example 1.

We claim as our invention:

1. The process of purifying 3-picoline that is contaminated by the co-presence of at least one of the bases 4-picoline and 2,6-lutidine, which consists in heating the contaminated 3-picoline with a compound of the class consisting of oxides, oxyhalides, and halides of phosphorus and of sulfur so that the 4-picoline and 2,6-lutidine are converted to complex and non-volatile reaction products, making the reaction mixture alkaline, and separating the 3-picoline from reaction products.

2. The process of purifying 3-picoline that is contaminated by the co-presence of at least one of the bases 4-picoline and 2,6-lutidine, which consists in heating the contaminated 3-picoline with a compound of the class consisting of oxides, oxyhalides, and halides of phosphorus and of sulfur so that the 4-picoline and 2,6-lutidine are converted to complex and non-volatile reaction products, making the reaction mixture alkaline, and separating the 3-picoline from reaction products by distillation.

3. The process of purifying 3-picoline that is contaminated by the co-presence of at least one of the bases 4-picoline and 2,6-lutidine, which consists in refluxing the contaminated 3-picoline with a compound of the class consisting of oxides, oxyhalides, and halides of phosphorus and of sulfur at atmospheric pressure so that the 4-picoline and 2,6-lutidine are converted to complex and non-volatile reaction products, making the reaction mixture alkaline, and separating the 3-picoline from reaction products.

4. The process of purifying 3-picoline that is contaminated by the co-presence of at least one of the bases 4-picoline and 2,6-lutidine, which consists in refluxing the contaminated 3-picoline with a compound of the class consisting of oxides, oxyhalides, and halides of phosphorus and of sulfur so that the 4-picoline and 2,6-lutidine are converted to complex and non-volatile reaction products, making the reaction mixture alkaline, and separating the 3-picoline from reaction products.

5. The process of purifying 3-picoline that is contaminated by the co-presence of at least one of the bases 4-picoline and 2,6-lutidine, which consists in heating the contaminated 3-picoline with chlorosulfonic acid, making the reaction mixture alkaline, and separating the 3-picoline from reaction products.

6. The process of purifying 3-picoline that is contaminated by the co-presence of at least one of the bases 4-picoline and 2,6-lutidine, which consists in heating the contaminated 3-picoline with chlorosulfonic acid, making the reaction mixture alkaline, and separating the 3-picoline from reaction products by distillation.

7. The process of purifying 3-picoline that is contaminated by the co-presence of at least one of the bases 4-picoline and 2,6-lutidine, which consists in refluxing the contaminated 3-picoline with chlorosulfonic acid at atmospheric pressure, making the reaction mixture alkaline, and separating the 3-picoline from reaction products.

8. The process of purifying 3-picoline that is contaminated by the co-presence of at least one of the bases 4-picoline and 2,6-lutidine, which consists in refluxing the contaminated 3-picoline with chlorosulfonic acid, making the reaction mixture alkaline, and separating the 3-picoline from reaction products.

9. The process of purifying 3-picoline that is contaminated by the co-presence of at least one of the bases 4-picoline and 2,6-lutidine, which consists in heating the contaminated 3-picoline with sulfur monochloride, making the reaction mixture alkaline and separating the 3-picoline from reaction products.

10. The process of purifying 3-picoline that is contaminated by the co-presence of at least one of the bases 4-picoline and 2,6-lutidine, which consists in heating the contaminated 3-picoline with sulfur monochloride, making the reaction mixture alkaline and separating the 3-picoline from reaction products by distillation.

11. The process of purifying 3-picoline that is contaminated by the co-presence of at least one of the bases 4-picoline and 2,6-lutidine, which consists in refluxing the contaminated 3-picoline with sulfur monochloride at atmospheric pressure, making the reaction mixture alkaline and separating the 3-picoline from reaction products.

12. The process of purifying 3-picoline that is contaminated by the co-presence of at least one of the bases 4-picoline and 2,6-lutidine, which consists in refluxing the contaminated 3-picoline with sulfur monochloride, making the reaction mixture alkaline, and separating the 3-picoline from reaction products.

13. The process of purifying 3-picoline that is contaminated by the co-presence of at least one of the bases 4-picoline and 2,6-lutidine, which consists in heating the contaminated 3-picoline with sulfur dioxide, making the reaction mixture alkaline, and separating the 3-picoline from reaction products.

14. The process of purifying 3-picoline that is contaminated by the co-presence of at least one of the bases 4-picoline and 2,6-lutidine, which consists in heating the contaminated 3-picoline with sulfur dioxide, making the reaction mixture alkaline, and separating the 3-picoline from reaction products by distillation.

15. The process of purifying 3-picoline that is contaminated by the co-presence of at least one of the bases 4-picoline and 2,6-lutidine, which consists in refluxing the contaminated 3-picoline with sulfur dioxide at atmospheric pressure, making the reaction mixture alkaline, and separating the 3-picoline from reaction products.

16. The process of purifying 3-picoline that is contaminated by the co-presence of at least one of the bases 4-picoline and 2,6-lutidine, which consists in refluxing the contaminated 3-picoline with sulfur dioxide, making the reaction mixture alkaline and separating the 3-picoline from reaction products.

FRANCIS E. CISLAK.
WILLIAM R. WHEELER.